US00RE34655E

United States Patent [19]

Harrison et al.

[11] E Patent Number: Re. 34,655

[45] Reissued Date of Patent: Jul. 5, 1994

[54] VEHICLE EXHAUST GAS SYSTEMS

[75] Inventors: Philip G. Harrison, Widmerpool; Peter J. F. Harris, Wantage, both of England

[73] Assignee: Arvin UK Limited, Lancashire, England

[21] Appl. No.: 850,282

[22] Filed: Mar. 12, 1992

Related U.S. Patent Documents

Reissue of:

[64] Patent No.: 4,908,192
Issued: Mar. 13, 1990
Appl. No.: 163,819
Filed: Mar. 10, 1988

[30] Foreign Application Priority Data

Aug. 8, 1986 [GB] United Kingdom ..... 8619456

[51] Int. Cl.[5] ..... B01D 53/36

[52] U.S. Cl. ..... 423/213.2; 502/310

[58] Field of Search ..... 502/310; 423/213.2, 423/213.5, 239, 239 A, 245.3, 247

[56] References Cited

U.S. PATENT DOCUMENTS

| | | | |
|---|---|---|---|
| 3,951,867 | 4/1976 | Howell | 423/213.2 |
| 4,003,978 | 1/1977 | Shiraishi et al. | 423/239 |
| 4,208,537 | 6/1980 | Kawamata et al. | 568/704 |
| 4,524,051 | 6/1985 | Wright et al. | 423/247 |
| 5,051,393 | 9/1991 | Harrison et al. | 502/310 |

FOREIGN PATENT DOCUMENTS

| | | | |
|---|---|---|---|
| 12656 | 12/1974 | Japan . | |
| 108169 | 8/1975 | Japan . | |
| 108666 | 9/1976 | Japan | 423/239 |
| 736997 | 6/1970 | U.S.S.R. . | |
| 691185 | 10/1979 | U.S.S.R. | 502/310 |
| 1476347 | 6/1972 | United Kingdom . | |
| 2070958 | 9/1981 | United Kingdom . | |
| 2155915 | 10/1985 | United Kingdom . | |

OTHER PUBLICATIONS

Bozso et al, "Oxidation of Ethylene, Ethylene Oxide and Propylene . . . " Symp. Mech. Hydrocarbon Reactions 5-7, Jun. 1973 Siofoa, Hungary, pp. 311-320.

Solymosi et al, "Adsorption and Reduction of NO on Tin (IV) Oxide Doped with Chromium (III) Oxide", Nov. 11, 1977, pp. 42-51.

Chemical Abstracts, vol. 91, Abstr. No. 97262b, 1979, "The Preparation and Activation of Tin (IV) Oxide—Chromium (III) Oxide Catalysts".

Chemical Abstracts, vol. 81, Abstr. No. 175627j, 1974, "Removing Nitrogen Oxides from Waste or Exhaust Gases . . . ".

Fuller et al, "The Catalytic Reduction of Nitrous Oxide by Carbon Monoxide Over Tin (IV) Oxide", Nov. 11, 1975, vol. 39, pp. 412-418.

Craft et al, "Water-Promoted Oxidation of Carbon Monoxide over Tin (IV) Oxide-Supported Palladium," *Nature*, Oct. 13, 1977, vol. 269, pp. 585-586.

Fuller et al, "Catalysis of the NO—CO Reaction . . . ", *Chemistry and Industry*, Sep. 18, 1976, pp. 787-788.

Fuller et al, "The Catalytic Reduction of Nitric Oxide by Carbon Monoxide over $SnO_2$—CuO Gels," *J. Catalysis*, 1976, vol. 42, pp. 418-424.

*Primary Examiner*—Jeffrey E. Russel

*Attorney, Agent, or Firm*—Shlesinger, Arkwright & Garvey

[57] ABSTRACT 2-way and 3-way catalyst compositions comprising tin(IV) oxide ($SnO_2$) and chromium(VI) oxide ($CrO_3$) are disclosed for use in catalytic converters for vehicle exhaust gas systems, such catalyst compositions being effective in the catalytic oxidation of carbon monoxide and unburnt hydrocarbons, and in the catalytic reduction of nitrogen oxides contained in the vehicle exhaust.

8 Claims, 10 Drawing Sheets

VEHICLE EXHAUST GAS SYSTEMS

Matter enclosed in heavy brackets [ ] appears in the original patent but forms no part of this reissue specification; matter printed in italics indicates the additions made by reissue.

TECHNICAL FIELD

This invention relates to catalyst composition primarily for use in the treatment of vehicle exhaust gas emissions to reduce the content of carbon monoxide and unburnt hydrocarbons, and thus to reduce pollution problems associated with vehicle exhausts.

However, whilst the invention will be particularly described hereinafter with reference to vehicle exhaust gas emissions, it is to be understood that the catalyst compositions described herein may well find other applications in the treatment of waste or other gases containing carbon monoxide, hydrocarbons and nitrogen oxides, alone or in combination, thereby to remove any or all of such components prior to disposal e.g. venting of the waste or other gas to the atmosphere.

BACKGROUND

Increasingly severe environmental regulations governing the emission of noxious gases into the atmosphere, and in particular, vehicle exhaust emissions, have stimulated a demand for catalysts active in the removal of such noxious components from the gases prior to disposal or venting to the atmosphere. In particular demand are 2- way and 3-way catalysts effective in removing carbon monoxide, unburnt hydrocarbons and/or nitrogen oxides from vehicle exhaust emissions, and this has led to the development of catalytic converters for attachment to vehicle exhaust gas emission systems to control the emission of carbon monoxide, unburnt hydrocarbons and/or nitrogen oxides to the atmosphere. Preferably such catalysts are active in the removal of all three, i.e. the so-called 3-way catalysts, but 2-way catalysts, or even 1-way catalysts do have some utility, not necessarily in the field of exhaust gas emissions, but in others.

PRIOR ART

Current commercial catalytic converters generally comprise one or more platinum group metals e.g. platinum, palladium, rhodium and rhenium, alone or in combination. Such converters tend therefore to be expensive. Attempts have been made either to reduce or eliminate altogether the dependence on platinum group metals in such systems. For example, in GB-A-2,070,958 an exhaust gas catalyst is disclosed comprising the combination of a platinum group metal and a base metal oxide selected from $SnO_2$, $TiO_2$ and $NiMoO_4$ deposited on a monolithic ceramic support coated with a refractory metal oxide, e.g. alumina.

Numerous other patent applications and scientific papers have been published on the subject, with activity largely being centered on tin(IV) oxide, i.e. $SnO_2$, as an essential catalyst component, alone or in combination either with platinum group metals, as already mentioned, or other base metal oxides, but the fact remains that the present commercially available or acceptable converters all employ a platinum group metal as a principal component. A non-exhaustive list of other relevant art relating to the use of tin(IV) oxide in the purification of exhaust or other waste gases is as follows:

Journal of Catalysis, 39 (1975), 412–418, Catalytic reduction of nitrous oxide by carbon monoxide over tin(IV) oxide;

Nature, 269 (1977), 585–586, Water-promoted oxidation of carbon monoxide over tin(IV) oxide-supported palladium;

Chemistry and Industry, (1976), 787–788, Catalysis of the NO—CO reaction: a further example of synergism in the Pd—$SnO_2$ system;

Journal of Catalysis, 42 (1976), 418–424, Catalytic reduction of nitric oxide by carbon monoxide over $SnO_2$—CuO gels; see also J.C.S. Chem. Comm. (1973) 210 and J.C.S. Chem. Comm. (1974) 56–57;

Japanese published patent application 75-108169, Catalytic treatment of waste gases, including vehicle exhaust emissions, with ammonia in the presence of an $SnO_2/Cr_2O_3$ catalyst to reduce nitrogen oxides;

USSR Patent No. 736,997, Carbon monoxide oxidation catalyst comprising $SnO_2$ and $Cr_2O_3$;

USSR Patent No. 691,185, Sulphur dioxide removal catalyst comprising $SnO_2$ and $Cr_2O_3$;

Prep. Catal. Proc. Int. Symp. 1975 (Published 1976) 197–206, Preparation and activation of tin(IV) oxide-chromium(III) oxide catalysts for nitric oxide reduction; see also J. Catal., 54(1978), 42–51;

Proc. Mech. Hydrocarbon React. Symp. (1975) 311–320, Catalytic oxidation of ethylene, ethylene oxide and propylene using tin(IV) oxide-chromium(III) oxide catalysts.

Other suggested combinations particularly for the catalytic reduction of nitrogen oxides include $SnO_2$—$V_2O_5$, Japanese published application 74-126561; mixed oxides of Ti and one or more of Nb, Fe, W, V, Ni, Co, Cu, Cr, U, Sn, DE-A-2458888; and $SnO_2$—$CeO_2$, Japanese published application 74-77881.

In Japanese published application 75-108169 and USSR Patent 736,997 a method is disclosed for preparing the $SnO_2$—$Cr_2O_3$ catalyst which comprises oxidising $SnCl_2$ in situ with $CrO_3$, but so far as is known no studies have been carried out specifically on catalyst systems comprising tin(IV) oxide and chromium(VI) oxide, i.e. the system: $SnO_2$–$CrO_3$.

Finally, in GB-A-1,476,347 a catalyst composition is disclosed for the catalytic oxidation and removal of ammonia from ammonia-containing gases, the catalyst comprising a complex oxide mixture of the formula $Cr_xA_yO_z$ where A, inter alia, can be Sn, x is 4 to 12, y is 0.2 to 8 and z is 6.2 to 42, and which composition is prepared by reacting a chromium containing compound, inter alia, chromic anhydride with a tin compound, e.g. $SnCl_4$, followed by calcination to convert the reaction product into oxide form. One such calcined oxide is given as having the formula $Cr_9Sn_3O_{19.5}$.

SUMMARY OF THE INVENTION

In accordance with the present invention, a catalyst composition has been discovered that has 2-way catalytic activity, i.e. in the catalytic oxidation of carbon monoxide and in the catalytic oxidation of hydrocarbons, which is comparable with, and in some cases substantially equals, the catalytic activity of the commercially available platinum based systems. The catalyst also shows some activity in the catalytic reduction of nitrogen oxides, and is therefore potentially useful as a 3-way catalyst in the treatment of vehicle exhaust gas emissions, and other gas streams containing nitrogen oxides as well as carbon monoxide and/or unburnt hydrocarbons.

DETAILED DESCRIPTION

Figure 1:
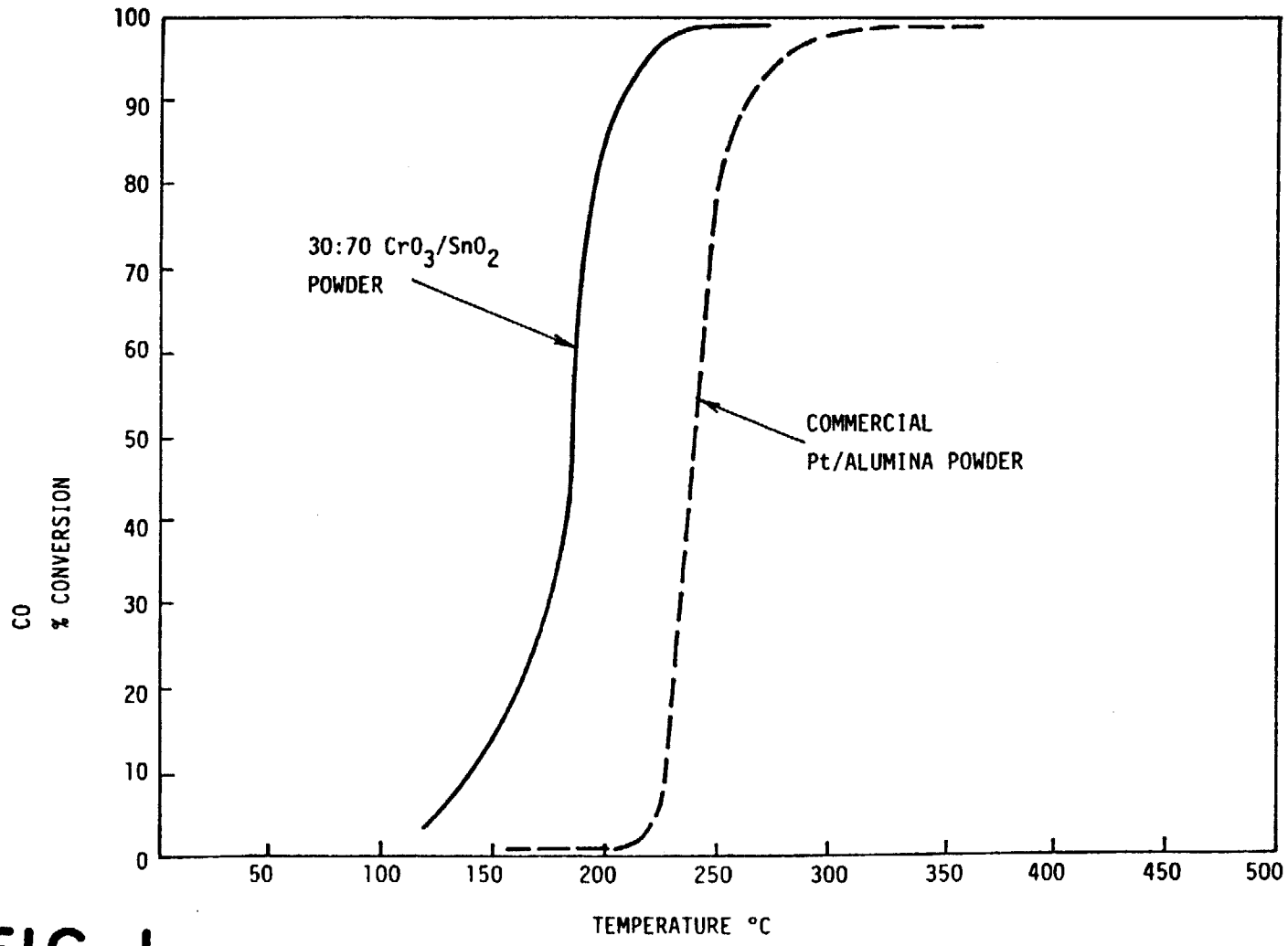
FIG. 1 compares the carbon monoxide conversion of a catalyst composition according to this invention comprising granular tin(IV) oxide impregnated with chromium(VI) oxide in a weight ratio of $CrO_3$:$SnO_2$ of 30:70 with that obtained with a commercial platinum-alumina catalyst.

The active catalyst compositions of this invention are tin(IV)-chromium(VI) oxide compositions obtained by impregnating tin(IV) oxide $SnO_2$ with chromium(VI) oxide, e.g. by impregnating with chromic acid, and calcining the resultant product at a temperature in the range 200° C. to 500° C., preferably 300° C. to 400° C.

Usually the catalyst composition will be dispersed on a high surface area catalyst support material, such as alumina, although a wide variety of other high surface area catalyst support materials are available e.g. zeolites and other molecular sieves, and may be used as catalyst support materials in this invention. Other suitable support materials include silica, magnesia and titania. Particularly preferred support materials are those comprising an alumina, or other refractory metal oxide coating on a monolithic ceramic or metal base. Such catalyst support materials are known and are commercially available, e.g. under the Trade name Cordierite.

Various techniques are available for dispersing the tin(IV) oxide and chromium(VI) oxide on the support. A convenient and currently preferred technique is to impregnate the support with a suspension of $SnO_2$ in an aqueous or organic medium followed by drying the impregnated support to deposit the tin(IV) oxide thereon. The tin(IV) oxide-containing support is then impregnated with an aqueous chromium(VI) oxide solution (chromic acid), and the reimpregnated support redried to deposit the chromium(VI) oxide prior to calcination.

In an alternative procedure, the tin(IV) oxide is formed in situ by impregnating the support with $SnCl_4$ and then washing the impregnated support first with water to form an unstable hydrated tin(IV) oxide precipitate, $SnO_2.H_2O.Cl^-$ and subsequently with aqueous ammonia to form a stable, hydrated oxide precipitate $SnO_2.H_2O$. The support is then washed with water to remove chloride ion, and thereafter impregnated with aqueous chromium(VI) oxide solution (chromic acid) and redried to deposit the $CrO_3$ prior to calcination.

In some circumstances, depending on the end use of the catalyst composition, the catalyst composition of this invention may simply comprise granules or pellets of tin oxide which have been impregnated with $CrO_3$, for example, by impregnation with chromic acid, dried and calcined.

The relative amounts of tin(IV) oxide and chromium(VI) oxide present in or used to prepare the catalyst compositions of this invention, are not narrowly critical and may range from 1 part tin (calculated as tin(IV) oxide) to 99 parts chromium (calculated as chromium(VI) oxide), all parts being by weight, to 99 parts tin to 1 part chromium, calculated on the same basis. However, the preferred range is from 40 to 90 parts tin, preferably 60 to 75, to correspondingly 60 to 10 parts chromium, preferably 40 to 25, calculated on the same basis. Alternatively expressed the Sn:Cr weight ratio (calculated as $SnO_2$:$CrO_3$) is preferably in the range 2:3 to 9:1, most preferably 3:2 to 3:1. The chromium concentration can be readily and easily controlled by adjusting the molar strength of the chromic acid solution used to impregnate the tin(IV) oxide.

Where the catalyst composition is deposited on a high surface area support, i.e. catalyst supports with a total surface area in the range 1.5 $m^2/dm^3$ to 2.5 $m^2/dm^3$, typically around 2 $m^2/dm^3$, catalyst loadings, i.e. calculated as total tin(IV) oxide/chromium(VI) oxide, may be anything from 1 to 500 $g/m^2$, depending on the activity of the particular catalytic composition, but more usually loadings are expected to be in the range of 50 to 150 $g/m^2$, preferably around 100 $g/m^2$.

The catalyst compositions of this invention show optimum catalytic activity for the oxidation of carbon monoxide and hydrocarbons and the catalytic reduction of nitrogen oxides at temperatures above about 250° C. e.g. up to 1100° C., and are generally operable with satisfactory results at temperatures in the range 300° to 900° C.

Although the presently preferred catalyst compositions of this invention consist essentially of a calcined mixture of tin(IV) oxide and chromium(VI) oxide, the addition to or presence of other metal oxides, particularly transition metal oxides in the calcined mixture, is not to be excluded.

Also included within the scope of this invention are catalytic converters for vehicle and other exhaust gas emissions containing, as the active catalytic ingredient, a calcined $SnO_2/CrO_3$ mixture as defined, and methods for the treatment of exhaust or waste or other gas streams, particularly vehicle exhaust gas emissions, to reduce carbon monoxide and/or hydrocarbon and/or nitrogen oxide levels therein, by the catalytic oxidation of said carbon monoxide and/or hydrocarbon, and/or the catalytic reduction of said nitrogen oxides, which comprises contacting the gas at elevated temperature effective to bring about said catalytic oxidation and/or said catalytic reduction, with a calcined $SnO_2/CrO_3$ mixture as defined. In this connection it is to be understood that, depending on the composition of the gas being treated, it may be necessary to add additional components such as air or oxygen to bring about the oxidation, and/or reducing agents such as hydrogen or ammonia to bring about the reduction of the nitrogen oxides. Such additions will, however, not be necessary if the gas being treated already contains sufficient oxidizing and reducing components, as will frequently be the case in vehicle exhaust gas emissions, to bring about the desired oxidations or reductions.

Catalyst compositions according to this invention, their preparation and activity are further described with reference to the following Examples and with reference to the accompanying drawings.

EXAMPLE 1

$CrO_3$ impregnated $SnO_2$ powder

Method (1) An aqueous tin(IV) oxide gel was first obtained by hydrolyzing distilled $SnCl_4$ with water to obtain a hydrated tin(IV) oxide (stannic acid) which was treated with ammonia to obtain a stabilised hydrated tin(IV) oxide $SnO_2.H_2O$. The stabilised product was washed thoroughly with water to remove all traces of chloride ion and then dried at 100° C. for 2 hours. The dried product was then impregnated with chromium(VI) oxide by refluxing the tin(IV) oxide powder (1 g) in 16 ml chromic acid solution (24 g.p.l.:0.24M) at 70° C. for 16 hours. The $CrO_3$ impregnated powder was dried at 100° C. for 2 hours and calcined in air for 1 to 2 hours at 300° C. to 400° C. The final product had a chromium/tin content corresponding to a $CrO_3$:$SnO_2$ weight ratio of 30:70.

Method (2) Method 1 was repeated but using a stabilised aqueous tin(IV) oxide sol obtained from The Harwell Laboratory and prepared by a sol-gel transformation process. (See for example United Kingdom Atomic Energy Authority, published UK Patent Application GB 2,155,915 A). 16 ml chromic acid solution (98 g.p.l.:0.98M) was added to 10 ml $SnO_2$ sol (368 g.p.l. $SnO_2$), which caused some gelation, and necessitated stirring in order to homogenise the mixture. Following the chromic acid addition the product was dried initially in an oven at 60° C. followed by calcination in air at 300° C. to 400° C. for 1 to 2 hours. Final $CrO_3$:$SnO_2$ ratio 30:70.

Method (3) 1 g anhydrous tin(IV) oxide (BDH Limited) was added to 16 ml aqueous chromic acid solution (26.7 g.p.l.:0.267M) and left to stand at room temperature for 24 hours with occasional stirring. The powder was filtered off, dried at 60° C. for 2 to 3 hours and calcined in air at 300° C. to 400° C. for a further 1 to 2 hours. Final $CrO_3$:$SnO_2$ ratio 30:70.

EXAMPLE 2

Alumina supported $SnO_2/CrO_3$ catalyst

Method (1) Following the procedure of Example 1, Method 1, a stabilised tin(IV) oxide product was obtained, and washed with water to remove all traces of chloride ion, following which the tin(IV) oxide was resuspended in water and washed over a commercial monolithic catalyst support (Cordierite: an alumina wash coated ceramic block) and dried at 100° C. for 2 hours. The monolith was then washed with 0.2M chromic acid solution, dried at 60° C. and then calcined in air at 300° C. to 400° C. for 1 to 2 hours. Catalyst loadings on the support were calculated to be of the order of 100 $g/m^2$ of total surface area.

Method (2) The monolithic support (Cordierite) is immersed in a stabilised tin(IV) oxide sol (The Harwell Laboratory) dried in an oven at 100° C., and then washed with 2 M chromic acid solution. The coated monolith is then oven dried at 60° C., and calcined in air at 300° C. to 400° C. for 1 to 2 hours.

TEST PROCEDURES

Catalyst compositions prepared as above were tested using the following gaseous compositions:

| | Vol. % |
|---|---|
| CO oxidation | |
| CO | 4–8 |
| $O_2$ | 4–8 |
| $N_2$ | Balance |
| Propane oxidation | |
| $nC_3H_8$ | 0.1–0.5 |
| $O_2$ | 10–20 |
| $N_2$ | Balance |
| NO reduction | |
| NO | 0.05 |
| CO | 5–10 |
| $N_2$ | Balance |

All tests reported herein were carried out either using a catalyst powder prepared as in Example 1, Method 2, or a monolithic supported catalyst block obtained as in Example 2, Method 2.

Comparisons were made with a commercial powdered 1% by wt. Pt-alumina catalyst (Ventron Alfa Products), or a commercial monolithic catalyst block (platinum and rhodium impregnated Cordierite, Pt:Rh ratio 5:1, loading 2 $g/dm^3$).

The tests carried out on an actual exhaust gas composition were carried out on the exhaust gas from a Honda internal combustion engine running on unleaded fuel.

Figure 2:
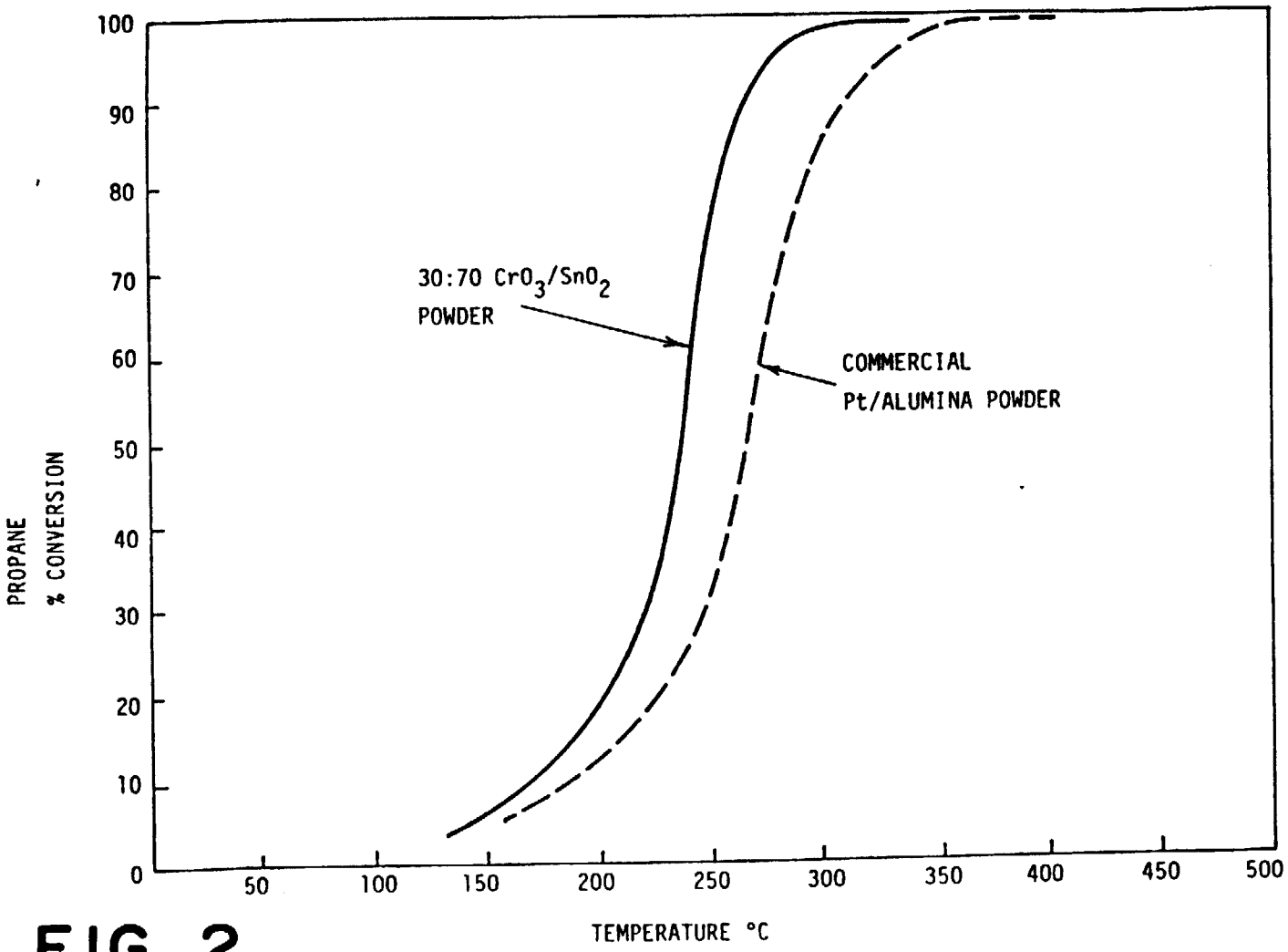
FIG. 2 compares the hydrocarbon (propane) conversion of the same two catalysts.
Figure 3:
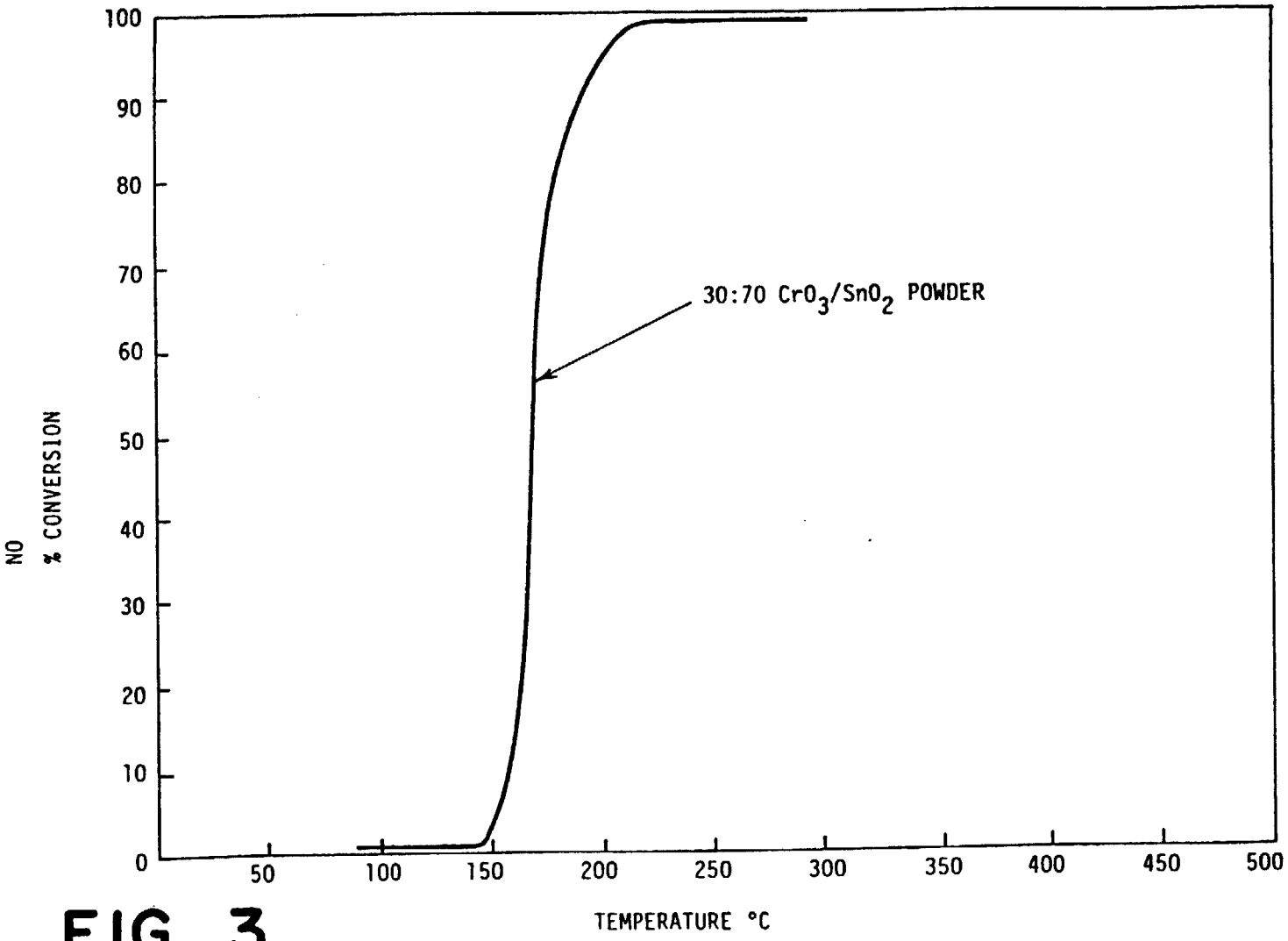
FIG. 3 shows the conversion of nitrogen oxides obtained with the same $CrO_3$:$SnO_2$ catalyst.

FIGS. 1 and 2 show that a catalyst powder according to this invention comprising a $CrO_3$ impregnated $SnO_2$ at a $CrO_3/SnO_2$ weight ratio of 30:70 gives substantially complete CO and hydrocarbon conversions at temperatures in the range 200° C. to 300° C., i.e. well within the normal temperature range of a vehicle exhaust, and very comparable with the conversions obtained using a commercial Pt-alumina powder. FIG. 3 shows complete NO reduction at the same temperature, i.e. indicating the 3-way catalyst utility of the compositions of this invention.

Figure 4:
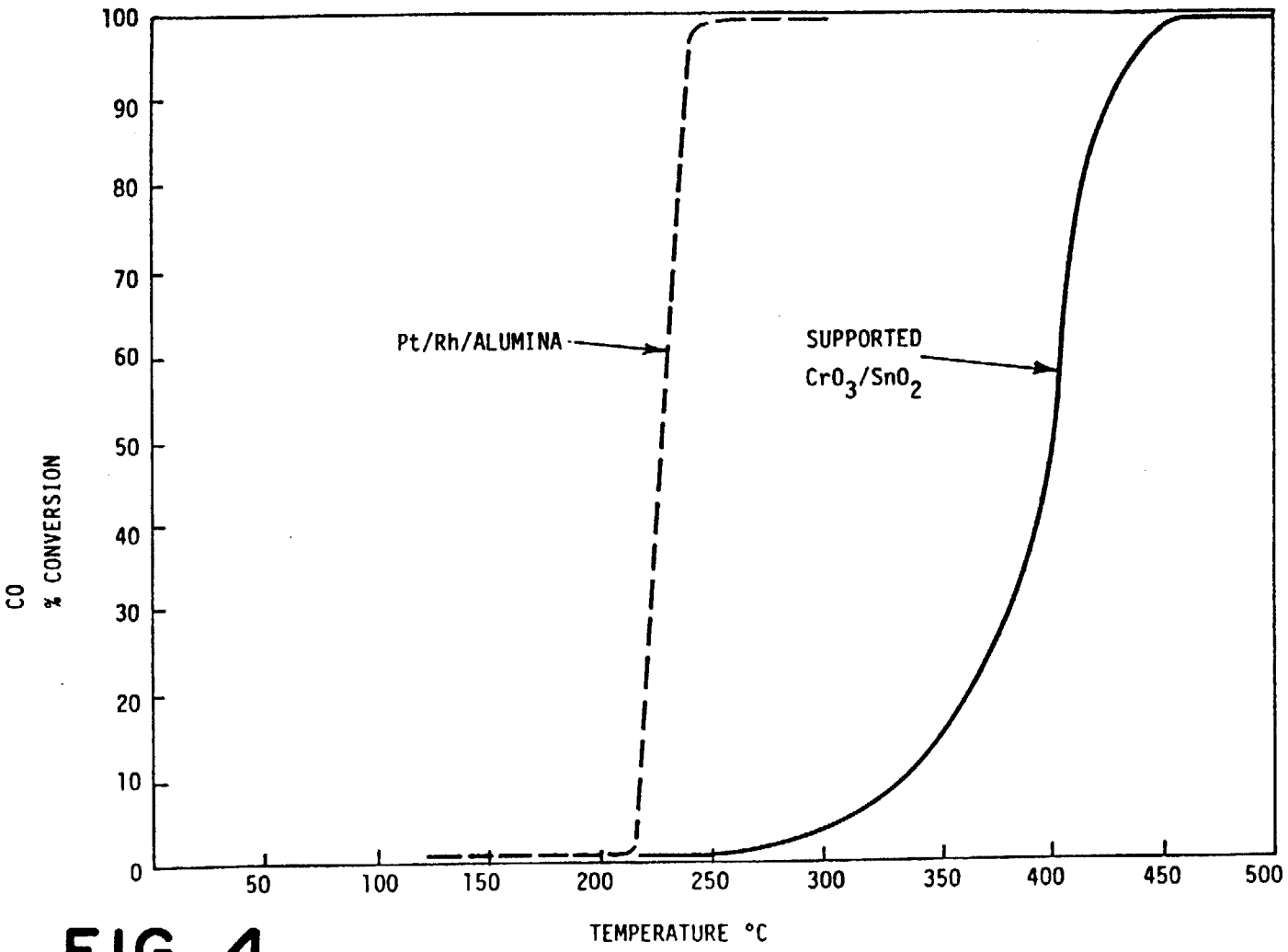
FIGS. 4, 5 and 6 compare the carbon monoxide, hydrocarbon (propane) and $NO_x$ conversion rates of a catalyst composition according to the invention comprising a commercial monolithic ceramic (Cordierite) catalyst support wash coated with alumina and impregnated with the $CrO_3/SnO_2$ catalyst with that obtained using a commercial exhaust gas catalyst comprising the same support material impregnated with platinum and rhodium.
Figure 5:
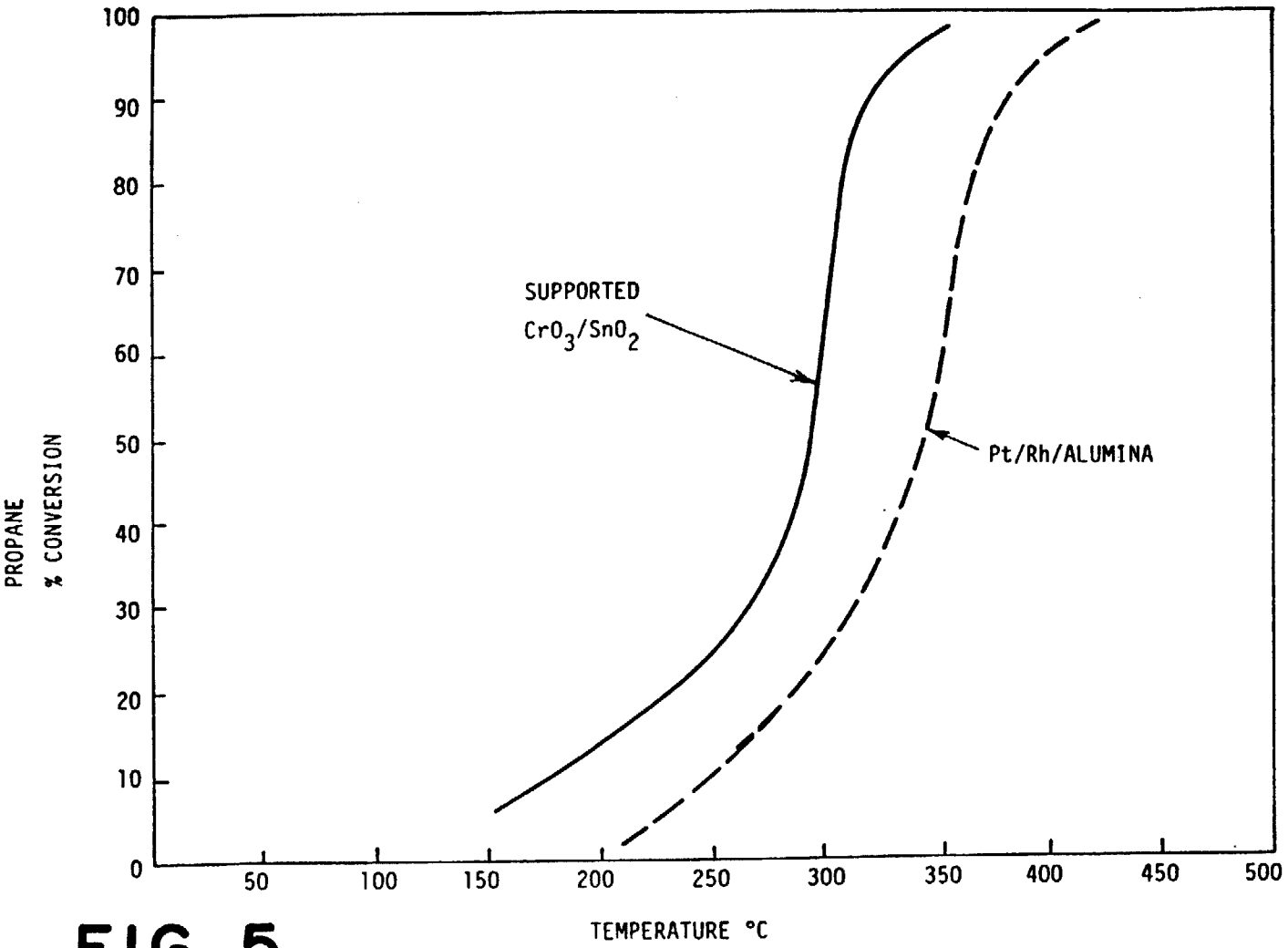
Figure 6:
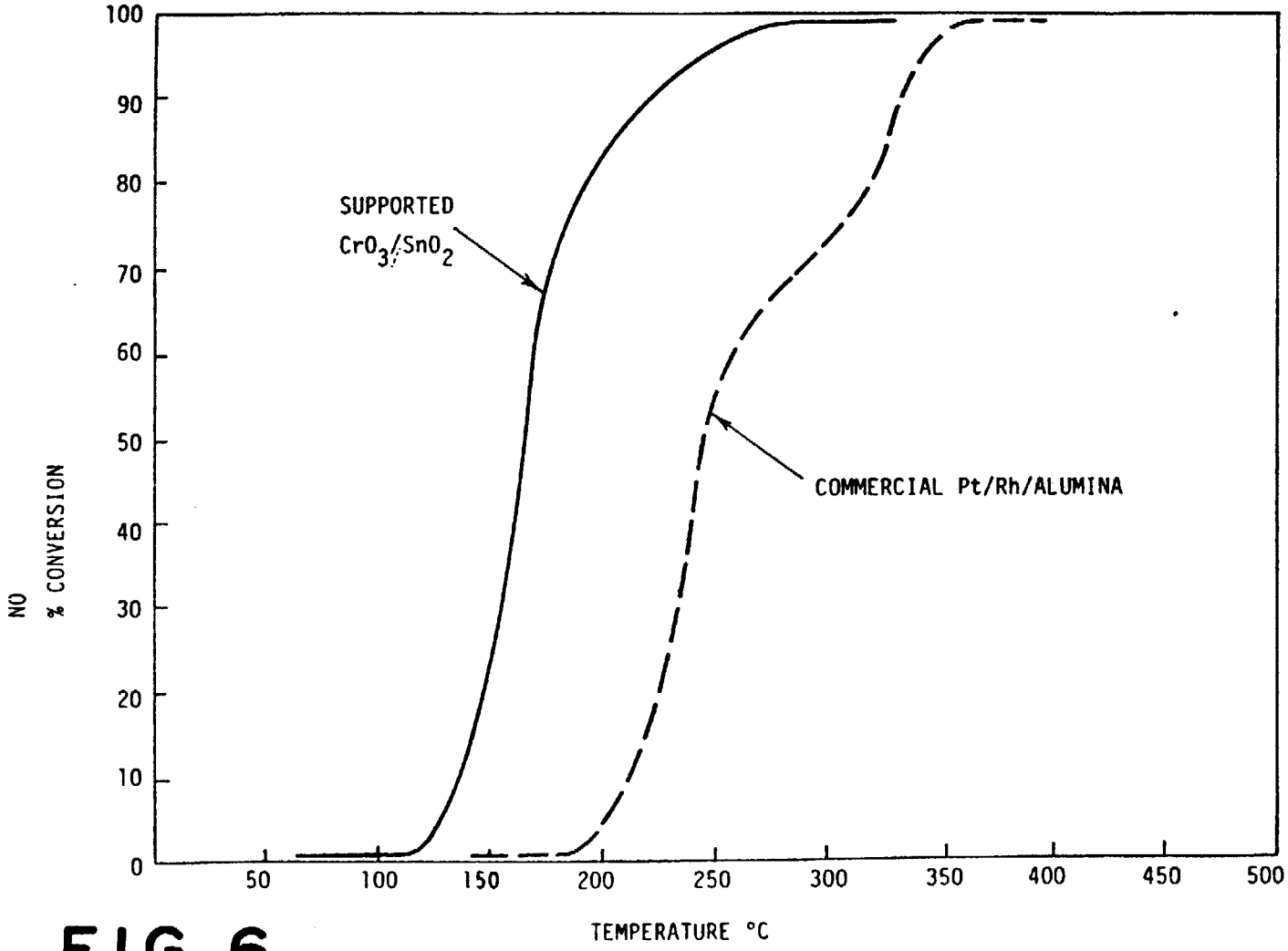

FIGS. 4 to 6 show the comparable results obtainable using the supported catalyst materials.

Figure 7:
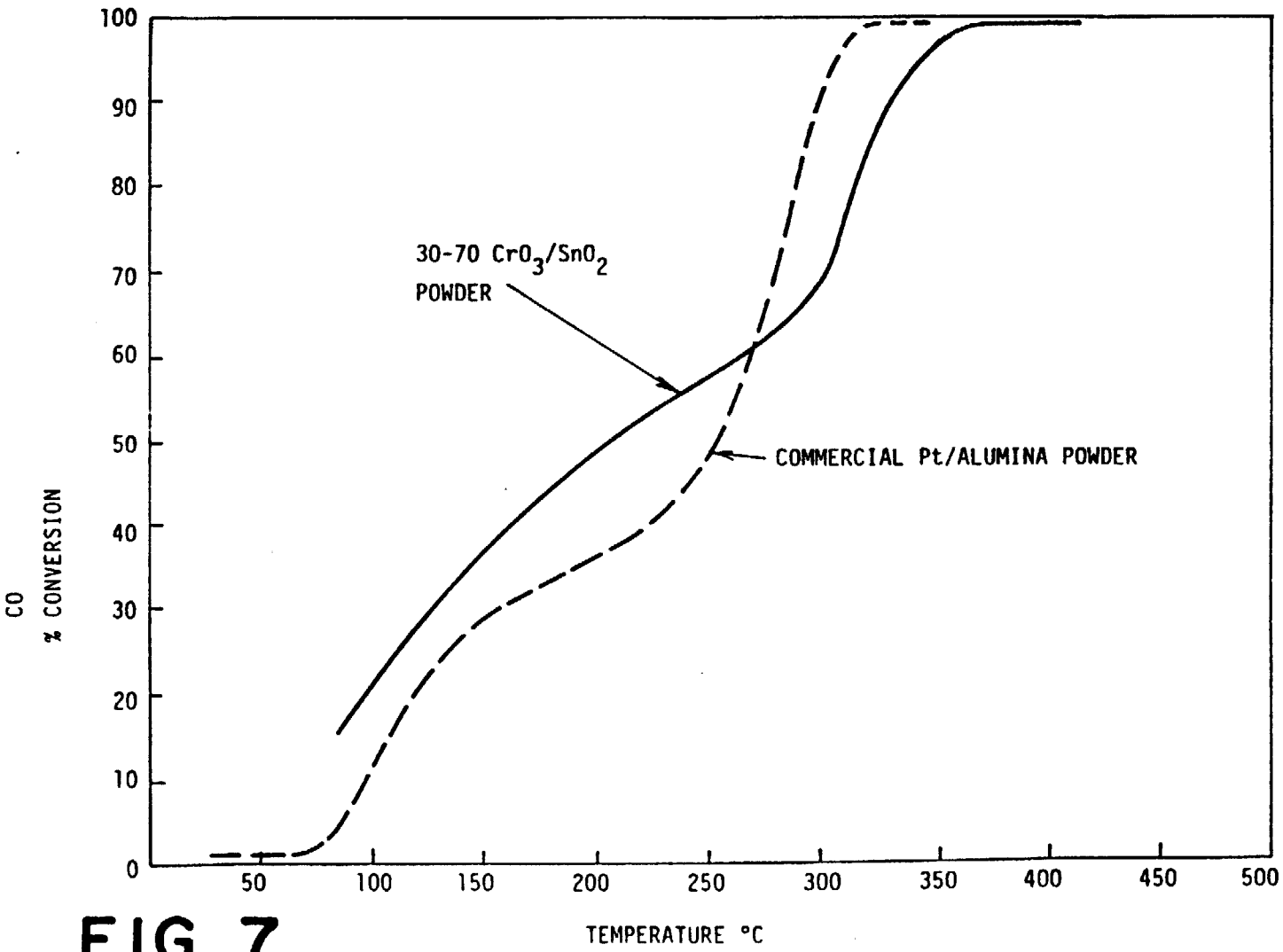
FIGS. 7 and 8 compare the carbon monoxide and hydrocarbon conversion rates obtained with a catalyst composition according to this invention (powdered $SnO_2$ impregnated with $CrO_3$, weight ratio $CrO_3$:$SnO_2$, 30:70) with those of a Pt-alumina catalyst using an exhaust gas from a 4-stroke internal combustion engine using unleaded fuel.
Figure 8:
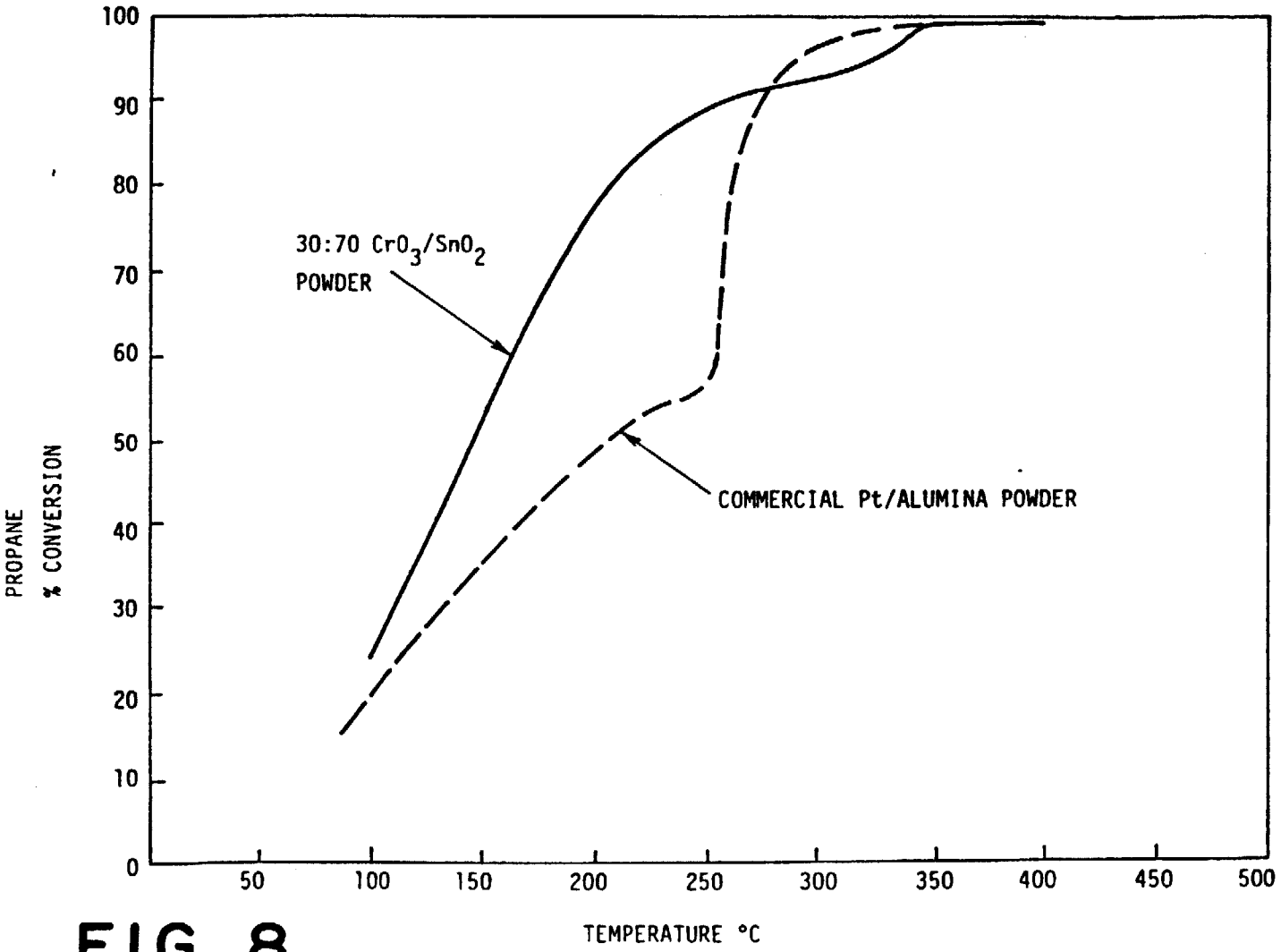

FIGS. 7 and 8 show the 2-way catalytic activity (CO oxidation and hydrocarbon oxidation) of the powdered catalyst compositions on an actual exhaust gas, and show complete CO removal and hydrocarbon removal at 350° C., quite comparable with the results obtained using a noble metal catalyst, platinum or alumina.

Figure 9:
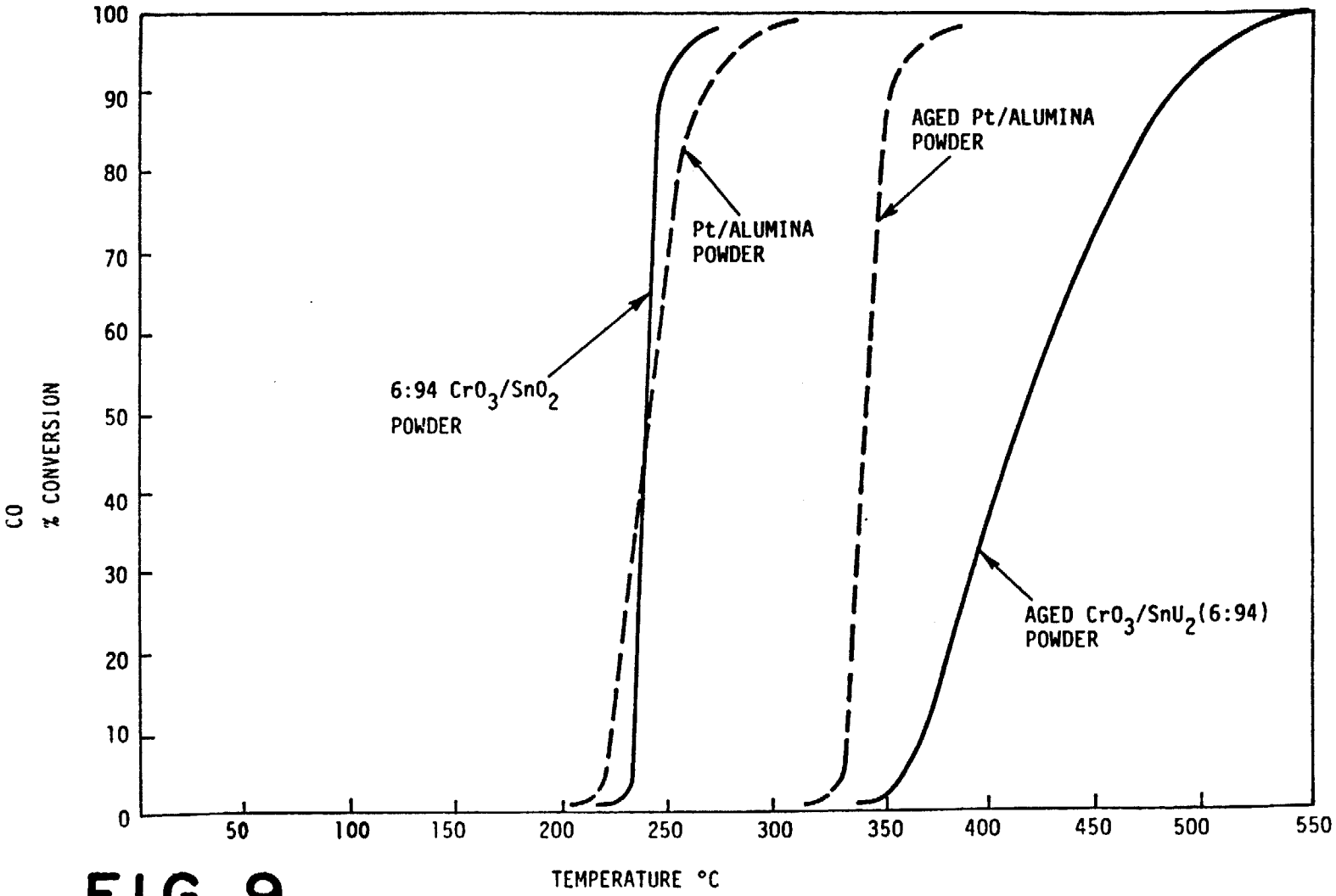
FIG. 9 compares the effect on CO oxidation of ageing a catalyst composition according to this invention ($CrO_3$ impregnated $SnO_2$ powder, weight ratio $CrO_3$:-$SnO_2$, 6:94) in air at 750° C. for 5 hours with the effect on a Pt-alumina catalyst.

FIG. 9 shows the effect on catalyst activity (CO oxidation) of prolonged heating of the catalyst powder. The graphs for Pt-alumina and the $CrO_3/SnO_2$ catalysts are, in fact, not strictly comparable since the $CrO_3/SnO_2$ catalyst used in this test was an unsupported $CrO_3/SnO_2$ powder.

Figure 10:
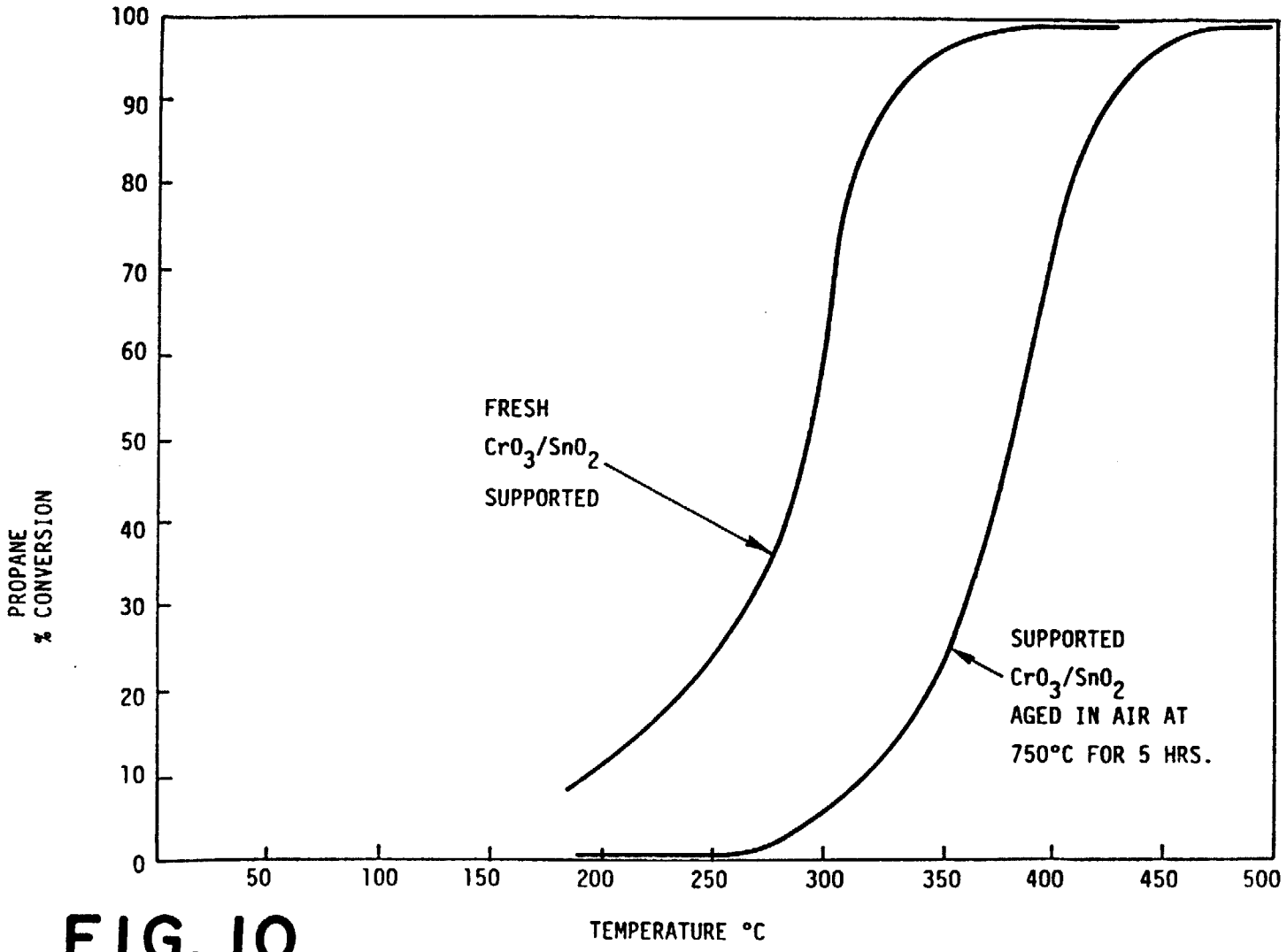
FIG. 10 shows the effect on hydrocarbon conversion of ageing a supported catalyst according to this invention in air at 750° C. for 5 hours.

FIG. 10 shows the effect on hydrocarbon conversion of ageing the supported catalyst (Example 2) in air at 750° C. for 5 hours.

All tests were carried out at a gas flow rate of 0.1 to 0.5 L/min.

CO, hydrocarbon and nitrogen oxide contents of the gas streams before and after contact with the catalyst were measured by methods standard in the automotive industry, namely CO content by infra-red analysis, hydrocarbon content by FID (flame ionisation detector), and nitrogen oxides by chemiluminescence.

As will be seen the conversion rates obtained: CO oxidation, propane oxidation and nitrogen oxide reduction, using catalyst compositions according to this invention are comparable with, and in many cases superior to, those obtained using commercial platinum-alumina and platinum-rhodium-alumina catalysts.

We claim:

1. A method for the catalytic oxidation of carbon monoxide and unburnt hydrocarbon components of vehicle exhaust gas streams, which comprises using as the catalyst a mixed oxide catalyst composition consisting *essentially* of *a calcined mixture of* tin (IV) oxide ($SnO_2$) and chromium (VI) oxide ($CrO_3$) free from platinum and other noble metals or noble metal oxides, and containing a Sn:Cr weight ratio (calculated as $SnO_2$:$CrO_3$) in the range of 1:99 to 99:1, said catalyst composition having been obtained by impregnating tin (IV) oxide ($SnO_2$) with chromium (VI) oxide ($CrO_3$) *to form an impregnated product consisting of tin (IV) oxide ($SnO_2$) and chromium (VI) oxide ($CrO_2$)* and calcining the resulting *impregnated* product.

2. The method according to claim 1, wherein:
(a) said Sn:Cr weight ratio is in the range of 2:3 to 9:1.

3. The method according to claim 1, wherein:
(a) said Sn:Cr weight ratio is in the range of 3:2 to 3:1.

4. The method of according to claim 1, wherein:
(a) the resulting product is obtained by impregnating tin (IV) oxide with aqueous chromic acid.

5. The method according to claim 1, wherein:
(a) the resulting product is obtained by treating a tin (IV) oxide sol with aqueous chromic acid.

6. The method according to claim 1, wherein:
(a) the catalyst composition consisting of the calcined mixture of tin (IV) oxide and chromium (VI) oxide free from platinum or other noble metals or noble metal oxides is dispersed on a catalyst support material.

7. The method according to claim 6, wherein:
(a) the catalyst support material comprises alumina.

8. The method according to claim 6, wherein:
(a) the catalyst support material comprises alumina coated on a ceramic or metal base.

* * * * *